(12) United States Patent
Schero

(10) Patent No.: US 11,445,701 B1
(45) Date of Patent: Sep. 20, 2022

(54) GROOMING TABLE SIDE GUARDS

(71) Applicant: Maryann Schero, Moriches, NY (US)

(72) Inventor: Maryann Schero, Moriches, NY (US)

(*) Notice: Subject to any disclaimer, the term of this patent is extended or adjusted under 35 U.S.C. 154(b) by 388 days.

(21) Appl. No.: 16/787,121

(22) Filed: Feb. 11, 2020

(51) Int. Cl.
| | |
|---|---|
| *A01K 13/00* | (2006.01) |
| *A47B 83/04* | (2006.01) |
| *A47B 9/20* | (2006.01) |
| *A47B 37/00* | (2006.01) |
| *A01K 1/06* | (2006.01) |

(52) U.S. Cl.
CPC ............ *A01K 13/00* (2013.01); *A01K 1/0613* (2013.01); *A47B 9/20* (2013.01); *A47B 37/00* (2013.01); *A47B 83/045* (2013.01)

(58) Field of Classification Search
CPC .......... A61D 3/00; A61G 13/02; A61G 13/06; A61G 13/05
USPC ..................... 108/115, 27; 119/753, 754, 756
See application file for complete search history.

(56) References Cited

U.S. PATENT DOCUMENTS

| | | | | |
|---|---|---|---|---|
| 926,579 | A * | 6/1909 | Laughlin | A61G 13/02 5/608 |
| 3,120,836 | A * | 2/1964 | Brauning | A61D 3/00 269/329 |
| 3,274,974 | A * | 9/1966 | Reynolds | A61D 1/005 248/404 |
| 5,915,334 | A * | 6/1999 | Cummings | A61D 3/00 119/757 |
| 6,516,752 | B2 | 2/2003 | Batterton | |
| 6,516,753 | B1 * | 2/2003 | Taylor | A01K 13/00 119/753 |
| 6,647,899 | B1 | 11/2003 | Lysien | |
| 7,219,625 | B2 | 5/2007 | Powers | |
| 7,357,098 | B2 | 4/2008 | Foster | |
| 7,921,812 | B1 * | 4/2011 | Carrillo | A01K 13/001 119/602 |
| 7,946,253 | B2 * | 5/2011 | Smith | A01K 13/001 119/756 |
| D653,818 | S | 2/2012 | Schetlin | |
| 8,333,159 | B2 * | 12/2012 | Schroer | A61D 3/00 119/753 |
| 2005/0124909 | A1 * | 6/2005 | Kasahara | A61B 5/4872 600/547 |
| 2007/0074674 | A1 | 4/2007 | Miller | |
| 2007/0256606 | A1 * | 11/2007 | Ivey | B60N 3/002 108/27 |
| 2017/0312159 | A1 * | 11/2017 | Fliege | A47B 1/10 |

(Continued)

FOREIGN PATENT DOCUMENTS

WO 2007021465 2/2007

*Primary Examiner* — Jose V Chen
(74) *Attorney, Agent, or Firm* — Kyle A. Fletcher, Esq.

(57) ABSTRACT

The grooming table side guard is configured for use with a companion animal. The grooming table side guard comprises a pedestal, a bridge lift, and a counter. The bridge lift attaches the counter to the pedestal. The counter forms an elevated horizontal surface on which the companion animal is placed for grooming. The bridge lift is a mechanical structure used to change the elevation of the counter. The pedestal forms the link in the load path that transfers the load of the bridge lift and the pedestal to a supporting surface. The counter further comprises a plurality of telescopic drawers. Each of the plurality of telescopic drawers forms a barrier along the perimeter of the counter that prevents the companion animal from falling off of the counter.

18 Claims, 6 Drawing Sheets

(56) References Cited

U.S. PATENT DOCUMENTS

2017/0325758 A1\* 11/2017 Staudinger ........... A61G 13/129
2017/0332606 A1    11/2017 Vanderdys
2017/0367913 A1\* 12/2017 Cox ....................... A61G 7/015
2018/0213944 A1\*  8/2018 Bedel ................... A47C 21/044

\* cited by examiner

GROOMING TABLE SIDE GUARDS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and animal husband, more specifically, a wash station for the grooming of an animal. (A01K13/001)

SUMMARY OF INVENTION

The grooming table side guard is configured for use with a companion animal. The grooming table side guard comprises a pedestal, a bridge lift, and a counter. The bridge lift attaches the counter to the pedestal. The counter forms an elevated horizontal surface on which the companion animal is placed for grooming. The bridge lift is a mechanical structure used to change the elevation of the counter. The pedestal forms the link in the load path that transfers the load of the bridge lift and the pedestal to a supporting surface. The counter further comprises a plurality of telescopic drawers. Each of the plurality of telescopic drawers forms a barrier along the perimeter of the counter that prevents the companion animal from falling off of the counter.

These together with additional objects, features and advantages of the grooming table side guard will be readily apparent to those of ordinary skill in the art upon reading the following detailed description of the presently preferred, but nonetheless illustrative, embodiments when taken in conjunction with the accompanying drawings.

In this respect, before explaining the current embodiments of the grooming table side guard in detail, it is to be understood that the grooming table side guard is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the grooming table side guard.

It is therefore important that the claims be regarded as including such equivalent construction insofar as they do not depart from the spirit and scope of the grooming table side guard. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
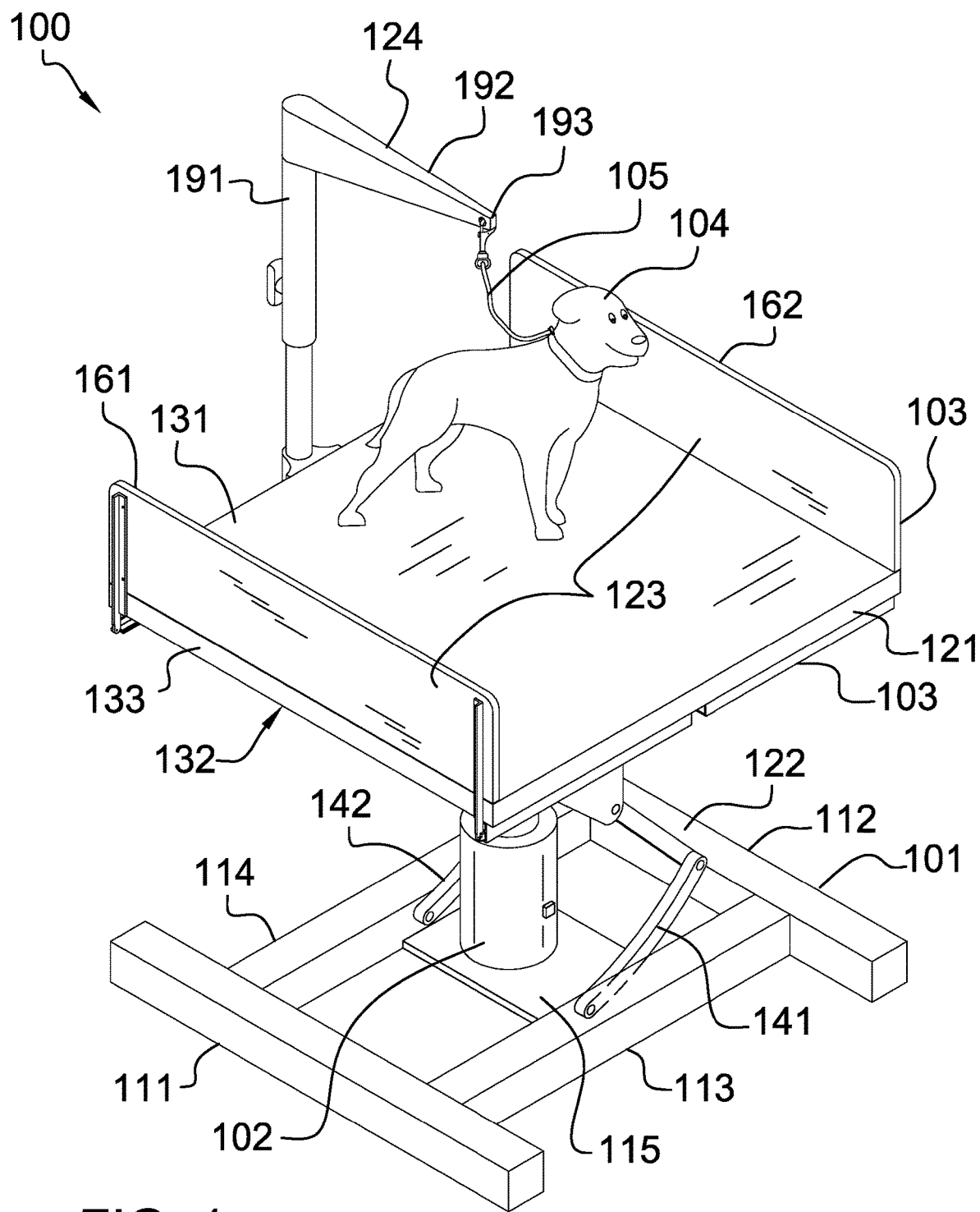
FIG. 1 is a perspective view of an embodiment of the disclosure.
Figure 2:
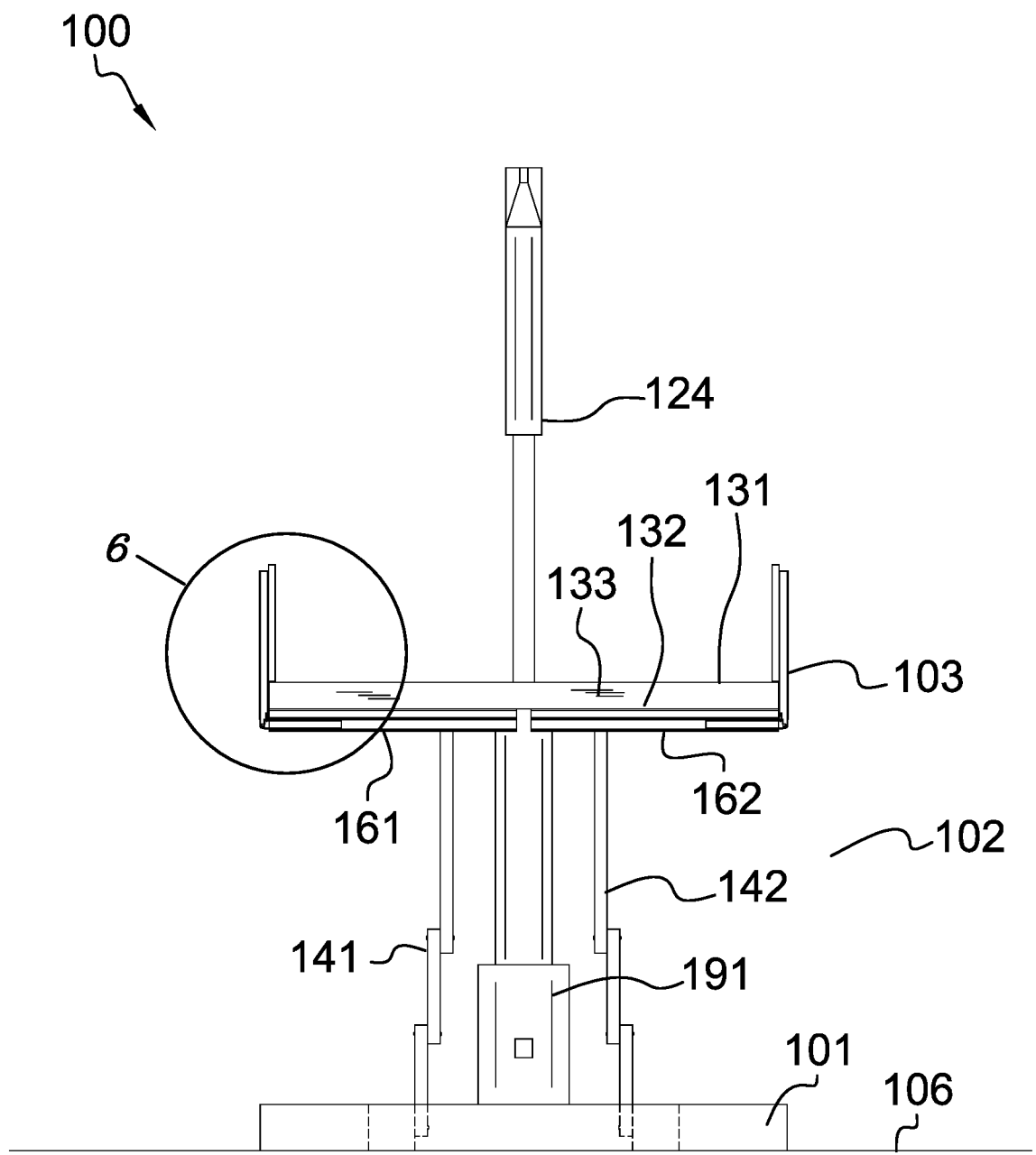
FIG. 2 is a front view of an embodiment of the disclosure.
Figure 3:
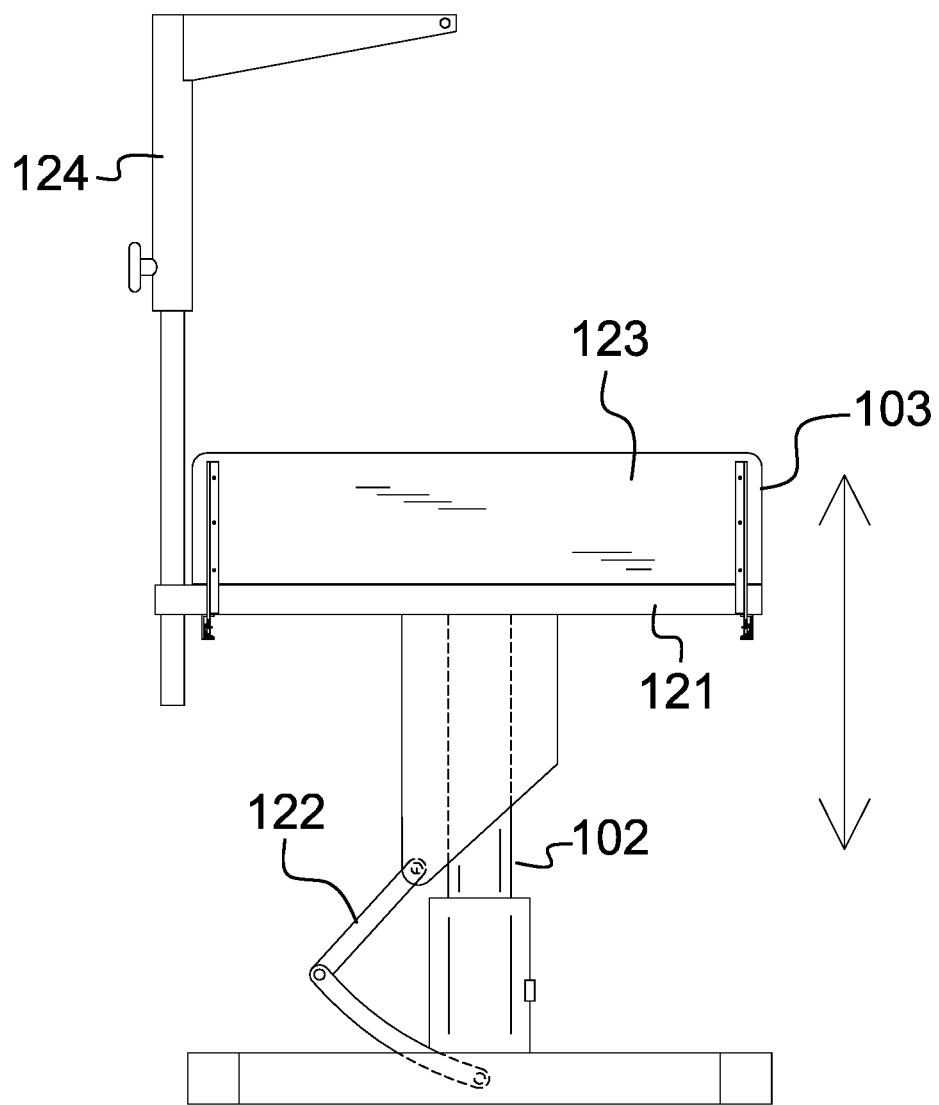
FIG. 3 is a side view of an embodiment of the disclosure.
Figure 4:
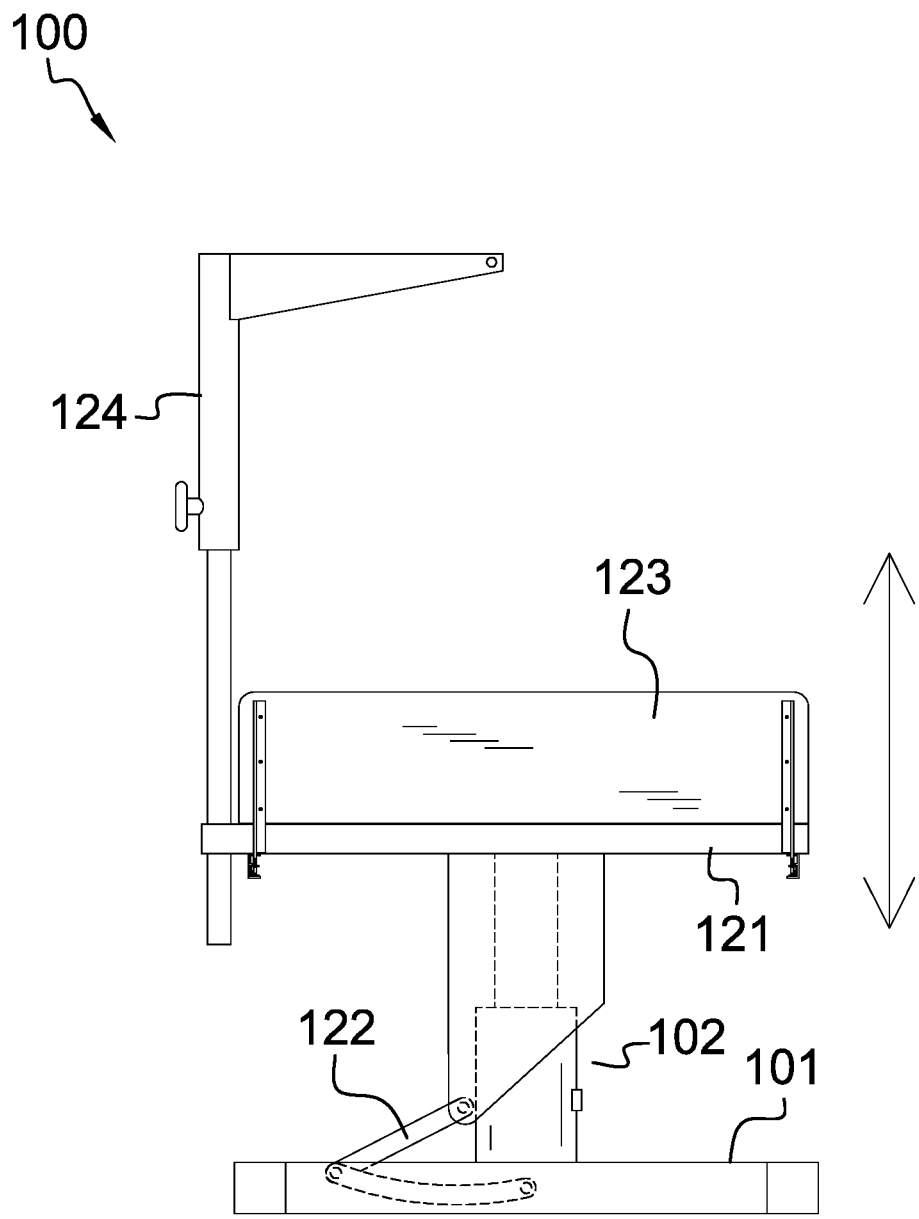
FIG. 4 is a side view of an embodiment of the disclosure.
Figure 5:
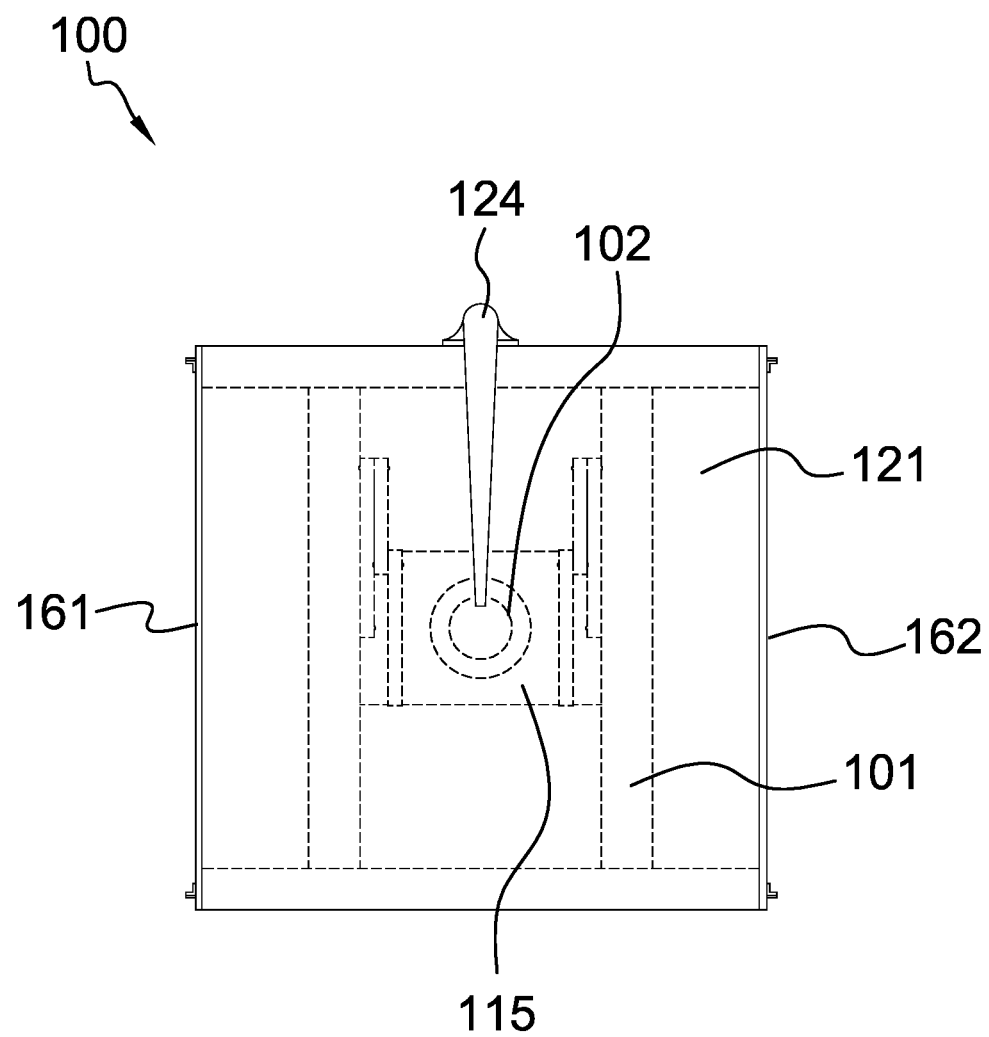
FIG. 5 is a top view of an embodiment of the disclosure.
Figure 6:
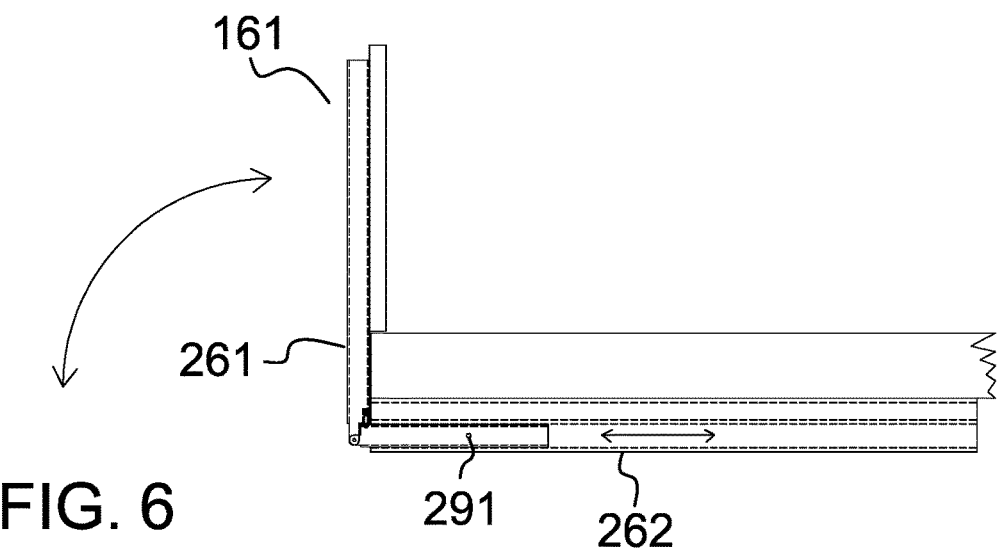
FIG. 6 is a detail view of an embodiment of the disclosure.
Figure 7:
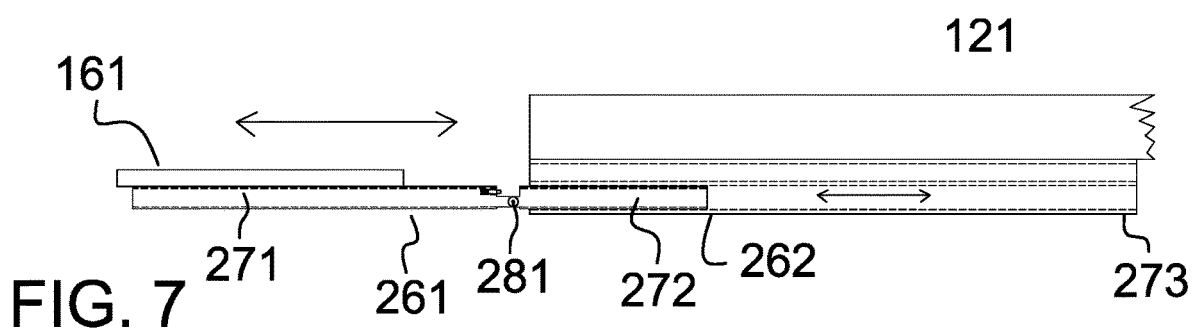
FIG. 7 is a detail view of an embodiment of the disclosure.
Figure 8:
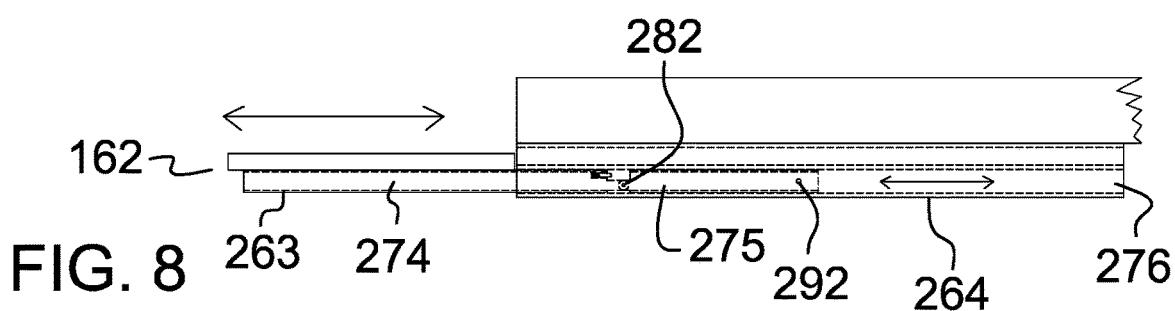
FIG. 8 is a detail view of an embodiment of the disclosure.
Figure 9:
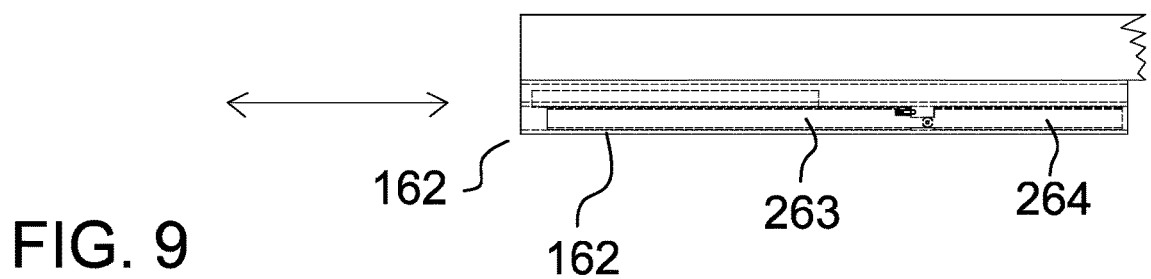
FIG. 9 is a detail view of an embodiment of the disclosure.

Detailed reference will now be made to one or more potential embodiments of the disclosure, which are illustrated in FIGS. 1 through 9.

The grooming table side guard 100 (hereinafter invention) is configured for use with a companion animal 104. The invention 100 comprises a pedestal 101, a bridge lift 102, and a counter 103. The bridge lift 102 attaches the counter 103 to the pedestal 101. The counter 103 forms an elevated horizontal surface on which the companion animal 104 is placed for grooming. The bridge lift 102 is a mechanical structure used to change the elevation of the counter 103. The pedestal 101 forms the link in the load path that transfers the load of the bridge lift 102 and the pedestal 101 to a supporting surface 106. The counter 103 further comprises a plurality of telescopic drawers 123. Each of the plurality of telescopic drawers 123 forms a barrier along the perimeter of the counter 103 that prevents the companion animal 104 from falling off of the counter 103.

The companion animal 104 is defined elsewhere in this disclosure. The leash 105 is defined elsewhere in this disclosure. The supporting surface 106 is defined elsewhere in this disclosure.

The pedestal 101 is a mechanical structure. The pedestal 101 forms the base of the invention 100. The pedestal 101 forms the link in the load path that transfers the load of the bridge lift 102 and the counter 103 to the supporting surface 106. The pedestal 101 comprises a first end beam 111, a second end beam 112, a first interior beam 113, a second interior beam 114, and a stanchion plate 115. The first end beam 111, the second end beam 112, the first interior beam 113, the second interior beam 114, and the stanchion plate 115 are interconnected.

The first end beam 111 is a prism structure. The first end beam 111 forms a prism with square congruent ends. The first end beam 111 forms a portion of the pedestal 101 that transfers a portion of the load of the bridge lift 102 and the counter 103 to the supporting surface 106.

The second end beam 112 is a prism structure. The second end beam 112 forms a prism with square congruent ends. The second end beam 112 forms a portion of the pedestal 101 that transfers a portion of the load of the bridge lift 102 and the counter 103 to the supporting surface 106. The position of the center axis of the prism structure of the second end beam 112 is parallel to the center axis of the first end beam 111.

The first interior beam 113 is a prism structure. The first interior beam 113 forms a prism with square congruent ends. The first interior beam 113 forms a portion of the pedestal 101 that transfers a portion of the load of the bridge lift 102 and the counter 103 to the supporting surface 106. The congruent ends of the prism structure of the first interior beam 113 attach the lateral face of the prism structure of the first end beam 111 to the lateral face of the prism structure of the second end beam 112. The center axis of the prism structure of the first interior beam 113 intersects perpendicularly to the center axis of the prism structure of the first end beam 111. The center axis of the prism structure of the first interior beam 113 intersects perpendicularly to the center axis of the prism structure of the second end beam 112.

The second interior beam 114 is a prism structure. The second interior beam 114 forms a prism with square congruent ends. The second interior beam 114 forms a portion of the pedestal 101 that transfers a portion of the load of the bridge lift 102 and the counter 103 to the supporting surface 106. The congruent ends of the prism structure of the second interior beam 114 attach the lateral face of the prism structure of the first end beam 111 to the lateral face of the prism structure of the second end beam 112. The center axis of the prism structure of the second interior beam 114 intersects perpendicularly to the center axis of the prism structure of the first end beam 111. The center axis of the prism structure of the second interior beam 114 intersects perpendicularly to the center axis of the prism structure of the second end beam 112. The position of the center axis of the prism structure of the second interior beam 114 is parallel to the center axis of the first interior beam 113.

The stanchion plate 115 is a plate. The stanchion plate 115 has a disk structure. The stanchion plate 115 attaches the lateral face of the prism structure of the first interior beam 113 to the lateral face of the prism structure of the second interior beam 114. The stanchion plate 115 attaches to the first interior beam 113 and the second interior beam 114 such that the faces of the disk structure of the stanchion plate 115 are horizontally oriented. The bridge lift 102 attaches to the pedestal 101 by mounting the bridge lift 102 to the superior horizontal surface of the stanchion plate 115.

The bridge lift 102 is a mechanical structure. The bridge lift 102 is a hydraulic structure. The bridge lift 102 is a telescopic structure. The bridge lift 102 attaches the counter 103 to the pedestal 101 such that the elevation of the counter 103 relative to the pedestal 101 is adjustable. The bridge lift 102 changes the elevation of the counter 103 such that the counter 103 continuously presents a horizontal surface on which the companion animal 104 can rest during the change of elevation of the counter 103. The bridge lift 102 forms the portion of the load path of the invention 100 that transfers the load of the counter 103 to the pedestal 101. Methods to design and build a hydraulic structure capable of performing the functions of the bridge lift 102 are well-known and documented in the mechanical arts.

The counter 103 forms a horizontal surface on which the companion animal 104 is placed during grooming. The counter 103 forms the superior structure of the invention 100. The counter 103 comprises a working surface 121, a plurality of articulated structures 122, a plurality of telescopic drawers 123, and a leash 105 arm 124. The plurality of articulated structures 122, the plurality of telescopic drawers 123, and the leash 105 arm 124 attach to the working surface 121.

The working surface 121 is a plate. The working surface 121 has a disk structure. The working surface 121 forms the primary structure of the counter 103. The plurality of articulated structures 122, the plurality of telescopic drawers 123, and the leash 105 arm 124 attach to the working surface 121. The working surface 121 attaches to the bridge lift 102 such that the center axis of the telescopic structure of the bridge lift 102 aligns with the center axis of the disk structure of the working surface 121. The working surface 121 attaches to the bridge lift 102 such that the center axis of the working surface 121 is parallel to the force of gravity. The working surface 121 is further defined with a superior surface 131, an inferior surface 132, and a plurality of lateral faces 133.

The superior surface 131 is a face of the disk structure that forms the working surface 121. The superior surface 131 forms the horizontal surface on which the companion animal 104 is placed during grooming. The inferior surface 132 is the face of the disk structure that forms the working surface 121 that is distal from the superior surface 131. The inferior surface 132 forms a horizontal surface. Each of the plurality of lateral faces 133 forms a vertical surface that attaches the superior surface 131 to the inferior surface 132. The bridge lift 102 attaches to the inferior surface 132 of the working surface 121. Each of the plurality of telescopic drawers 123 mounts on a lateral face selected from the plurality of lateral faces 133. The leash 105 arm 124 mounts on a lateral face selected from the plurality of lateral faces 133.

Each of the plurality of articulated structures 122 is a mechanical structure. Each of the plurality of articulated structures 122 is a rotating structure. Each of the plurality of articulated structures 122 forms a bracing structure that stabilizes the counter 103 during the use of the invention 100. The plurality of articulated structures 122 further comprises a first articulated arm 141 and a second articulated arm 142.

Each of the plurality of telescopic drawers 123 forms a barrier structure. Each of the plurality of telescopic drawers 123 attaches to a lateral face selected from the plurality of lateral faces 133 of the working surface 121 such that the plurality of telescopic drawers 123 project above the superior surface 131 of the working surface 121. Each of the plurality of telescopic drawers 123 is a telescopic structure such that the span of the vertical distance that each of the plurality of telescopic drawers 123 extends above the superior surface 131 of the working surface 121 is adjustable. The plurality of telescopic drawers 123 contain the companion animal 104 on the superior surface 131 of the working surface 121. The plurality of telescopic drawers 123 comprises a first telescopic drawer 161 and a second telescopic drawer 162.

The first telescopic drawer 161 is a mechanical structure. The first telescopic drawer 161 is a telescopic structure. The first telescopic drawer 161 forms a barrier along the perimeter of the superior surface 131 of the counter 103 that keeps the companion animal 104 on the working surface 121. The telescopic nature of the first telescopic drawer 161 allows the elevation of the first telescopic drawer 161 to be stored along the inferior surface 132 of the working surface 121. The first telescopic drawer 161 is withdrawn from underneath the working surface 121 and rotates into a position such that the first telescopic drawer 161 forms a vertical barrier along the perimeter formed along the plurality of lateral faces 133 of the working surface.

The first telescopic drawer 161 is a telescopic structure that comprises a first drawer panel 261, a second drawer panel 262, and a first detent 291. The first detent 291 is a mechanical device that locks and secures the first drawer panel 261 to the second drawer panel 262. The first drawer panel 261 is a prism that is further defined with an inner dimension. The second drawer panel 262 is a hollow prism that is further defined with an outer dimension. The second drawer panel 262 is geometrically similar to the first drawer panel 261. The span of the outer dimension of the second drawer panel 262 is lesser than the span of the inner dimension of the first drawer panel 261 such that the second drawer panel 262 inserts into the first drawer panel 261 in a telescopic fashion to form a composite prism structure.

The span of the length of the first telescopic drawer 161 adjusts by adjusting the relative position of the second drawer panel 262 within the first drawer panel 261. The position of the second drawer panel 262 relative to the first drawer panel 261 is held in position using the first detent 291. The first detent 291 is selected from the group consisting of a cotter pin, a G snap collar, a cam lock collar, a threaded clutch, a split collar lock, and a spring loaded ball lock.

The first drawer panel 261 further comprises a first drawer plate 271, a second drawer plate 272, and a first drawer hinge 281. The second drawer panel 262 further comprises a third drawer plate 273.

The first drawer plate 271 is a disk-shaped structure. The first drawer plate 271 is geometrically similar to the third drawer plate 273 of the second drawer panel 262 such that the first drawer plate 271 inserts into the hollow interior of the third drawer plate 273. The second drawer plate 272 is a disk-shaped structure. The second drawer plate 272 is geometrically similar to the third drawer plate 273 of the second drawer panel 262 such that the second drawer plate 272 inserts into the hollow interior of the third drawer plate 273.

The first drawer hinge 281 attaches the first drawer plate 271 to the second drawer plate 272 to form the first drawer panel 261. The first drawer hinge 281 attaches the first drawer plate 271 to the second drawer plate 272 such that the first drawer plate 271 rotates relative to the second drawer plate 272. The first drawer hinge 281 is a locking hinge structure that locks the first drawer plate 271 into a fixed position relative to the second drawer plate 272. The second drawer plate 272 is intended to remain in the third drawer plate 273 that forms the second drawer panel 262 when the first drawer plate 271 rotates relative to the second drawer plate 272 to form the vertical barrier that encloses a portion of the working surface 121.

The third drawer plate 273 is a hollow disk-shaped structure. The third drawer plate 273 forms the mechanical structure that creates the second drawer panel 262. The third drawer plate 273 attaches to the inferior surface 132 of the working surface 121 to attach the first telescopic drawer 161 to the working surface 121.

The second telescopic drawer 162 is a mechanical structure. The second telescopic drawer 162 is a telescopic structure. The second telescopic drawer 162 forms a barrier along the perimeter of the superior surface 131 of the counter 103 that keeps the companion animal 104 on the working surface 121. The telescopic nature of the second telescopic drawer 162 allows the elevation of the second telescopic drawer 162 to be stored along the inferior surface 132 of the working surface 121. The second telescopic drawer 162 is withdrawn from underneath the working surface 121 and rotates into a position such that the second telescopic drawer 162 forms a vertical barrier along the perimeter formed along the plurality of lateral faces 133 of the working surface.

The second telescopic drawer 162 is a telescopic structure that comprises a third drawer panel 263, a fourth drawer panel 264, and a second detent 292. The second detent 292 is a mechanical device that locks and secures the fourth drawer panel 264 to the third drawer panel 263. The third drawer panel 263 is a prism that is further defined with an inner dimension. The fourth drawer panel 264 is a hollow prism that is further defined with an outer dimension. The fourth drawer panel 264 is geometrically similar to the third drawer panel 263. The span of the outer dimension of the third drawer panel 263 is lesser than the span of the inner dimension of the fourth drawer panel 264 such that the fourth drawer panel 264 inserts into the third drawer panel 263 in a telescopic fashion to form a composite prism structure.

The span of the length of the second telescopic drawer 162 adjusts by adjusting the relative position of the third drawer panel 263 within the fourth drawer panel 264. The position of the third drawer panel 263 relative to the fourth drawer panel 264 is held in position using the second detent 292. The second detent 292 is selected from the group consisting of a cotter pin, a G snap collar, a cam lock collar, a threaded clutch, a split collar lock, and a spring loaded ball lock.

The third drawer panel 263 further comprises a fourth drawer plate 274, a fifth drawer plate 275, and a second drawer hinge 282. The fourth drawer panel 264 further comprises a sixth drawer plate 276.

The fourth drawer plate 274 is a disk-shaped structure. The fourth drawer plate 274 is geometrically similar to the sixth drawer plate 276 of the fourth drawer panel 264 such that the fourth drawer plate 274 inserts into the hollow interior of the sixth drawer plate 276. The fifth drawer plate 275 is a disk-shaped structure. The fifth drawer plate 275 is geometrically similar to the sixth drawer plate 276 of the fourth drawer panel 264 such that the fifth drawer plate 275 inserts into the hollow interior of the sixth drawer plate 276.

The second drawer hinge 282 attaches the fourth drawer plate 274 to the fifth drawer plate 275 to form the fourth drawer panel 264. The second drawer hinge 282 attaches the fourth drawer plate 274 to the fifth drawer plate 275 such that the fourth drawer plate 274 rotates relative to the fifth drawer plate 275. The second drawer hinge 282 is a locking hinge structure that locks the fourth drawer plate 274 into a fixed position relative to the fifth drawer plate 275. The fifth drawer plate 275 is intended to remain in the sixth drawer plate 276 that forms the fourth drawer panel 264 when the fourth drawer plate 274 rotates relative to the fifth drawer plate 275 to form the vertical barrier that encloses a portion of the working surface 121.

The sixth drawer plate 276 forms the mechanical structure that creates the fourth drawer panel 264. The sixth drawer plate 276 is a hollow disk-shaped structure. The sixth drawer plate 276 attaches to the inferior surface 132 of the working surface 121 to attach the second telescopic drawer 162 to the working surface 121.

The leash 105 arm 124 is a mechanical structure. The leash 105 arm 124 is a telescopic structure. The leash 105 arm 124 forms an anchor point 193 to which the leash 105 of the companion animal 104 attaches. The telescopic nature of the leash 105 arm 124 allows the elevation of the anchor point 193 relative to the superior surface 131 of the working surface 121 to adjust to accommodate the size of the companion animal 104. The leash 105 arm 124 attaches to a lateral face selected from the plurality of lateral faces 133 of the working surface 121. The leash 105 arm 124 comprises a telescopic stanchion 191, a jib 192, and an anchor point 193.

The telescopic stanchion 191 is a stanchion. The telescopic stanchion 191 raises the jib 192 above the superior surface 131 of the counter 103. The telescopic stanchion 191 is a telescopic structure. The span of the length of the telescopic stanchion 191 is adjustable such that the elevation of the jib 192 above the superior surface 131 of the counter 103 is adjustable.

The jib 192 is a cantilever beam that attaches to the end of the telescopic stanchion 191 that is distal from the superior surface 131 of the counter 103. The anchor point 193 is a structure used to attach the leash 105 to the jib 192. The jib 192 extends the reach between the anchor point 193 and the telescopic stanchion 191 such that the anchor point 193 can be positioned over the superior surface 131 of the counter 103. The anchor point 193 attaches to the end of the jib 192 that is distal from the telescopic stanchion 191.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Articulated: As used in this disclosure, articulated refers to two objects that are joined together using a hinge or a flexible joint such that the first object moves relative to the second object. A structure that contains an articulated subcomponent is referred to as an articulated structure.

Barrier: As used in this disclosure, a barrier is a physical obstacle that forms a boundary between a first space and a second space. The barrier prevents the passage of an object between the first space and the second space.

Beam: As used in this disclosure, a beam is a horizontally oriented load bearing structure.

Bridge Lift: As used in this disclosure, a bridge lift is a mechanical device that raises and lowers a horizontal platform such that the horizontal surface of the horizontal platform retains its orientation relative to the force of gravity.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cavity: As used in this disclosure, a cavity is an empty space or negative space that is formed within an object. See Saucer Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Companion Animal: As used in this disclosure, a companion animal is a domesticated animal that is maintained primarily for companionship. A companion animal is often referred to as a pet.

Composite: As used in this disclosure, composite refers to a two-dimensional or three-dimensional structure that that is formed from two or more distinctly identifiable sub-structures.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Counter: As used in this disclosure, a counter is a horizontal surface that: a) attaches to a vertical surface; and, b) is used as a working space for projects. A counter is further defined with an inferior surface and a superior surface.

Search terms:

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk.

In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hydraulic: As used in this disclosure, hydraulic refers to a device wherein the movement of the device is powered using a fluid under pressure.

Inferior: As used in this disclosure, the term inferior refers to a directional reference that is parallel to and in the same direction as the force of gravity when an object is positioned or used normally.

Jack: As used in this disclosure, a jack is a mechanical device for lifting heavy loads by means of a force applied with a lever, screw, or hydraulic press.

Jib: As used in this disclosure, a jib is a beam structure that: 1) is mounted with a free end in the manner of a cantilever; and, 2) suspends a load at the free end of the jib. In multicomponent beam structures, such as with a crane, the jib is the sub-structure that physically suspends the load.

Leash: As used in this disclosure, a leash is a tether that is used to control the movements of an animal.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Orientation: As used in this disclosure, orientation refers to the positioning of a first object relative to: 1) a second object; or, 2) a fixed position, location, or direction.

Pedestal: As used in this disclosure, a pedestal is an intermediary load bearing structure that that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Plate: As used in this disclosure, a plate is a smooth, flat and semi-rigid or rigid structure that has at least one dimension that: a) is of uniform thickness; and b) that appears thin relative to the other dimensions of the object. Plates are often disks. The face of the plate is a surface of the plate selected from the group consisting of: a) the surface of the plate with the greatest surface area; b) the surface of the plate that is distal from the surface of the plate with the greatest surface area. The edges of the plate comprises the surfaces of the plate that would not be considered faces as defined above. As defined in this disclosure, plates may be made of any material, but are commonly made of metal, plastic, and wood. When made of wood, a plate is often referred to as a board.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Shaft: As used in this disclosure, a shaft is a long, narrow and rigid prism structure that is used as: 1) a structural element of a larger object; or 2) as a grip or lever for a handle. Shafts often have a cylindrical shape.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Table: As used in this disclosure, a table is a furniture item that provides a horizontal surface raised above a supporting surface. The table is an extension apparatus that forms a load path between items placed on the horizontal surface raised and the supporting surface on which the table rests.

Telescopic: As used in this disclosure, telescopic is an adjective that describes an object made of sections that fit or slide into each other such that the object can be made longer or shorter by adjusting the relative positions of the sections.

Tether: As used in this disclosure, a tether is a cord, line, webbing, or strap that is attached to an object to restrict its movement.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A grooming table with a side guard comprising a pedestal, a bridge lift, and a counter;
   wherein the bridge lift attaches the counter to the pedestal;
   wherein the grooming table with a side guard is configured for use with a companion animal;
   wherein the grooming table with a side guard forms an elevated horizontal surface on which the companion animal is placed for grooming;
   wherein the counter further comprises a plurality of telescopic drawers;
   wherein each of the plurality of telescopic drawers forms a barrier that prevents the companion animal from falling off of the grooming table with a side guard;
   wherein the pedestal forms the link in a load path that transfers a load of the bridge lift and the counter to the supporting surface;
   wherein the counter forms a horizontal surface on which the companion animal is placed during grooming;
   wherein the counter forms a superior structure of the grooming table with a side guard;
   wherein the pedestal comprises a first end beam, a second end beam, a first interior beam, a second interior beam, and a stanchion plate.

2. The grooming table with a side guard according to claim 1
   wherein the pedestal is a mechanical structure;
   wherein the pedestal forms the base of the grooming table with a side guard.

3. The grooming table with a side guard according to claim 2
   wherein the bridge lift is a mechanical structure;
   wherein the bridge lift is a hydraulic structure;
   wherein the bridge lift is a telescopic structure;
   wherein the bridge lift attaches the counter to the pedestal such that the elevation of the counter relative to the pedestal is adjustable;
   wherein the bridge lift changes the elevation of the counter such that the counter continuously presents a horizontal surface on which the companion animal can rest during the change of elevation of the counter;
   wherein the bridge lift forms the portion of the load path of the grooming table with a side guard that transfers the load of the counter to the pedestal.

4. The grooming table with a side guard according to claim 3
   wherein the first end beam, the second end beam, the first interior beam, the second interior beam, and the stanchion plate are interconnected;
   wherein the first end beam is a prism structure;
   wherein the first end beam forms a prism with square congruent ends;
   wherein the second end beam is a prism structure;
   wherein the second end beam forms a prism with square congruent ends;
   wherein the first interior beam is a prism structure;
   wherein the first interior beam forms a prism with square congruent ends;
   wherein the second interior beam is a prism structure;
   wherein the second interior beam forms a prism with square congruent ends;
   wherein the stanchion plate is a plate;
   wherein the stanchion plate has a disk structure.

5. The grooming table with a side guard according to claim 4
   wherein the first end beam forms a portion of the pedestal that transfers a portion of the load of the bridge lift and the counter to the supporting surface;
   wherein the second end beam forms a portion of the pedestal that transfers a portion of the load of the bridge lift and the counter to the supporting surface;
   wherein the position of the center axis of the prism structure of the second end beam is parallel to the center axis of the first end beam;
   wherein the first interior beam forms a portion of the pedestal that transfers a portion of the load of the bridge lift and the counter to the supporting surface;
   wherein the congruent ends of the prism structure of the first interior beam attach the lateral face of the prism structure of the first end beam to the lateral face of the prism structure of the second end beam;
   wherein the center axis of the prism structure of the first interior beam intersects perpendicularly to the center axis of the prism structure of the first end beam;

wherein the center axis of the prism structure of the first interior beam intersects perpendicularly to the center axis of the prism structure of the second end beam;

wherein the second interior beam forms a portion of the pedestal that transfers a portion of the load of the bridge lift and the counter to the supporting surface;

wherein the congruent ends of the prism structure of the second interior beam attach the lateral face of the prism structure of the first end beam to the lateral face of the prism structure of the second end beam;

wherein the center axis of the prism structure of the second interior beam intersects perpendicularly to the center axis of the prism structure of the first end beam;

wherein the center axis of the prism structure of the second interior beam intersects perpendicularly to the center axis of the prism structure of the second end beam;

wherein the position of the center axis of the prism structure of the second interior beam is parallel to the center axis of the first interior beam.

6. The grooming table with a side guard according to claim 5
wherein the stanchion plate attaches the lateral face of the prism structure of the first interior beam to the lateral face of the prism structure of the second interior beam;

wherein the stanchion plate attaches to the first interior beam and the second interior beam such that the faces of the disk structure of the stanchion plate are horizontally oriented.

7. The grooming table with a side guard according to claim 6 wherein the bridge lift attaches to the pedestal by mounting the bridge lift to the superior horizontal surface of the stanchion plate.

8. The grooming table with a side guard according to claim 7
wherein the counter comprises a working surface, a plurality of articulated structures, a plurality of telescopic drawers, and a leash arm;

wherein the plurality of articulated structures, the plurality of telescopic drawers, and the leash arm attach to the working surface.

9. The grooming table with a side guard according to claim 8
wherein the working surface is a plate;
wherein the working surface has a disk structure;
wherein the working surface attaches to the bridge lift such that the center axis of the telescopic structure of the bridge lift aligns with the center axis of the disk structure of the working surface;

wherein the working surface attaches to the bridge lift such that the center axis of the working surface is parallel to a force of gravity;

wherein the working surface is further defined with a superior surface, an inferior surface, and a plurality of lateral faces.

10. The grooming table with a side guard according to claim 9
wherein the bridge lift attaches to the inferior surface of the working surface;
wherein each of the plurality of telescopic drawers mounts on a lateral face selected from the plurality of lateral faces;
wherein the leash arm mounts on a lateral face selected from the plurality of lateral faces.

11. The grooming table with a side guard according to claim 10
wherein each of the plurality of articulated structures is a mechanical structure;
wherein each of the plurality of articulated structures is a rotating structure;
wherein each of the plurality of articulated structures forms a bracing structure that stabilizes the counter during the use of the grooming table with a side guard.

12. The grooming table with a side guard according to claim 11
wherein each of the plurality of telescopic drawers forms a barrier structure;
wherein each of the plurality of telescopic drawers attaches to the working surface such that the plurality of telescopic drawers project above the superior surface of the working surface;
wherein each of the plurality of telescopic drawers is a telescopic structure.

13. The grooming table with a side guard according to claim 12
wherein the plurality of telescopic drawers comprises a first telescopic drawer and a second telescopic drawer;
wherein the first telescopic drawer is a mechanical structure;
wherein the first telescopic drawer is a telescopic structure;
wherein the first telescopic drawer forms a barrier along the perimeter of the superior surface of the counter that keeps the companion animal on the working surface;
the second telescopic drawer is a mechanical structure;
wherein the second telescopic drawer is a telescopic structure;
wherein the second telescopic drawer forms a barrier along the perimeter of the superior surface of the counter that keeps the companion animal on the working surface.

14. The grooming table with a side guard according to claim 13
wherein the plurality of articulated structures further comprises a first articulated arm and a second articulated arm;
wherein the first articulated arm forms a brace that attaches counter such that the counter maintains its horizontal position when the grooming table with a side guard is subjected to unanticipated transient forces;
wherein the second articulated arm forms a brace that attaches counter such that the counter maintains its horizontal position when the grooming table with a side guard is subjected to unanticipated transient forces.

15. The grooming table with a side guard according to claim 14
wherein the first articulated arm is a mechanical structure;
wherein the first articulated arm is a rotating structure;
wherein the second articulated arm is a mechanical structure;
wherein the second articulated arm is a rotating structure;
wherein the first articulated arm rotates such that the first articulated arm effectively braces the counter independently of the elevation of the counter;
wherein the second articulated arm rotates such that the second articulated arm effectively braces the counter independently of the elevation of the counter.

16. The grooming table with a side guard according to claim 15 wherein the first telescopic drawer comprises a first drawer panel and a second drawer panel;
wherein the second drawer panel attaches to the inferior surface of the working surface;

wherein the first drawer panel inserts into the second drawer panel.

17. The grooming table with a side guard according to claim 16
   wherein the second telescopic drawer comprises a third drawer panel and a fourth drawer panel;
   wherein the fourth drawer panel attaches to the inferior surface of the working surface;
   wherein the third drawer panel inserts into the fourth drawer panel.

18. The grooming table with a side guard according to claim 17
   wherein the leash arm is a mechanical structure;
   wherein the leash arm is a telescopic structure;
   wherein the leash arm forms an anchor point to which the leash of the companion animal attaches;
   wherein the leash arm attaches to a lateral face selected from the plurality of lateral faces of the working surface;
   wherein the leash arm comprises a telescopic stanchion, a jib, and an anchor point;
   wherein the telescopic stanchion is a stanchion;
   wherein the telescopic stanchion raises the jib above the superior surface of the counter;
   wherein the telescopic stanchion is a telescopic structure;
   wherein the span of the length of the telescopic stanchion is adjustable such that the elevation of the jib above the superior surface of the counter is adjustable;
   wherein the jib is a cantilever beam that attaches to the end of the telescopic stanchion that is distal from the superior surface of the counter;
   wherein the anchor point is a structure used to attach the leash to the jib;
   wherein the jib extends the reach between the anchor point and the telescopic stanchion such that the anchor point can be positioned over the superior surface of the counter;
   wherein the anchor point attaches to the end of the jib that is distal from the telescopic stanchion.

\* \* \* \* \*